Aug. 25, 1953 DE MAR B. PERKINS 2,650,055
JACK BRACKET
Filed July 1, 1949
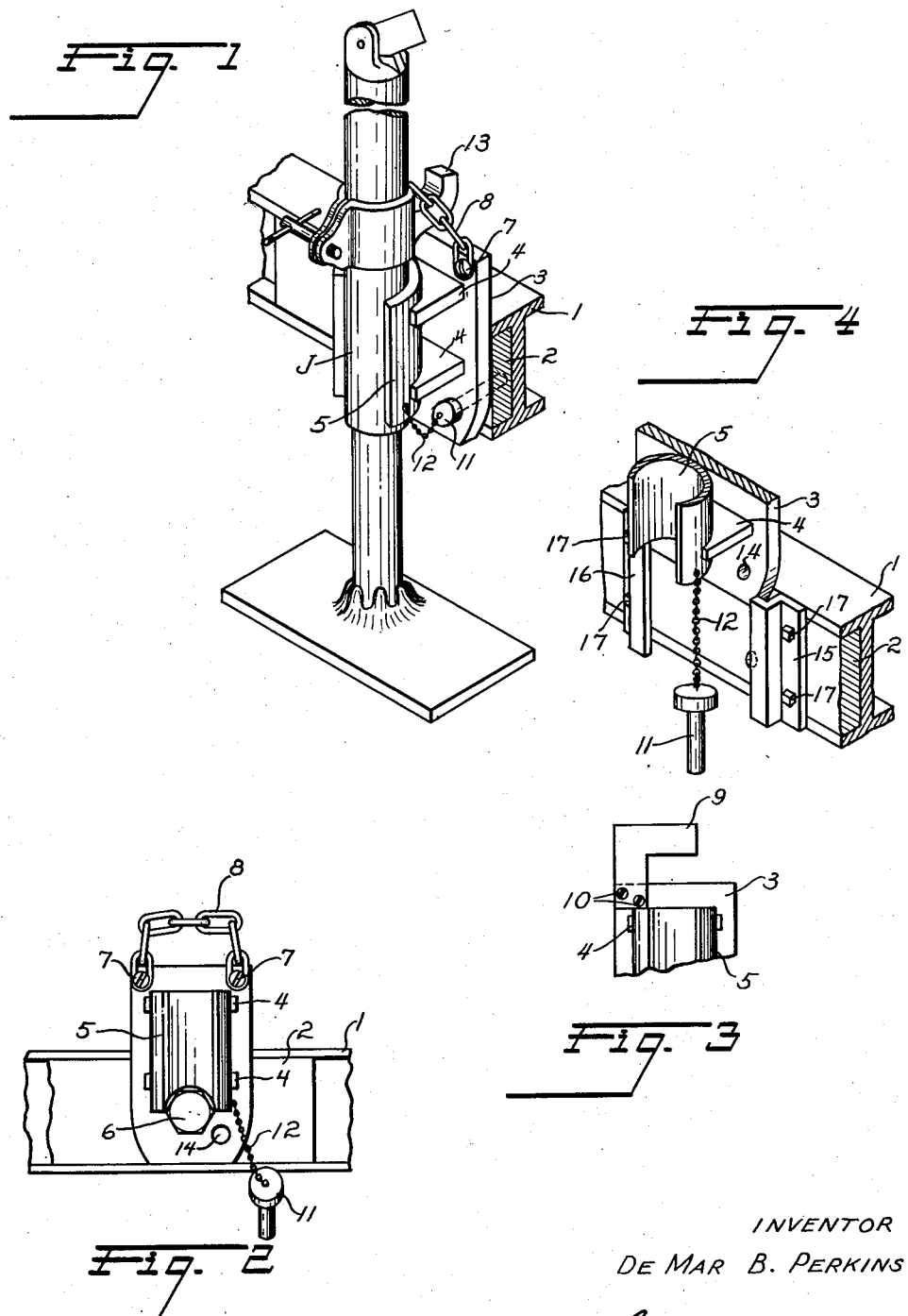
INVENTOR
DE MAR B. PERKINS
ATTORNEYS

UNITED STATES PATENT OFFICE 2,650,055

JACK BRACKET

De Mar B. Perkins, Monticello, Utah

Application July 1, 1949, Serial No. 102,581

1 Claim. (Cl. 248—291)

The present invention relates to a bracket and, more particularly, to a bracket adapted to be attached to a trailer or other vehicle to facilitate the raising and lowering thereof.

The invention relates particularly to a jack bracket which may advantageously be used in connection with a flat bed trailer of the type in which the wheels are removable to permit easy loading and unloading of heavy equipment.

Users of heavy rolling machinery, such as tractors and farm equipment, have experienced great difficulty in loading machinery on a trailer in order to transport the equipment from one location to another. The difficulty is created by the nature of the trailers used at the present time. The body of the trailer is permanently mounted on wheels and it is necessary to roll the machinery up an incline to load the trailer. This difficulty has been overcome by providing a trailer with removable wheels. When it is desired to load the trailer, the wheels are removed so that the flat body of the trailer rests on the ground. The equipment is loaded by merely running it onto the body of the trailer, the trailer jacked up and the wheels placed in the proper position. It will be readily understood that a great saving of time is thereby effected.

It is an object of the present invention to provide a bracket which may be attached to the body of the flat bed trailer, a portion of the bracket adapted to receive the movable part of a jack whereby when the part engages the bracket, the trailer may be raised or lowered, as desired.

Other objects and features of novelty of the invention will be made apparent by the following description and the annexed drawing which, it will be understood, are only illustrative of my invention and impose no limitation thereon not imposed by the appended claim.

Referring to the drawing, in which similar reference numerals refer to like parts, Fig. 1 is a perspective view of my improved bracket in operative position;

Fig. 2 is a front view of the bracket;

Fig. 3 is a front partial view of a modification thereof; and

Fig. 4 is a perspective view of a further modification.

In the embodiment of my invention disclosed in Figs. 1 and 2, 1 is a section of an I beam or other frame member forming part of the side frame of a trailer. Mounted in the face of the I beam is a metal block 2, the purpose of the block being to provide a flat, solid face for the beam.

The bracket, which forms the basic subject matter of the present invention, comprises a flat plate 3 having mounted on the face thereof two spaced-apart, substantially parallel and horizontally disposed flat supporting members 4. These members support a vertically positioned sleeve member 5. The sleeve member 5 is adapted to receive a movable body portion of a jack J. A bolt 6 extends through the lower portion of the plate 3, the block 2 and the I beam and is fastened by a nut, not shown, on the inner face of the I beam. This construction allows the bracket to be pivotally mounted on the beam 1. The upper portion of the plate, at opposite sides thereof, is provided with two screws 7 which do not project therethrough. A flexible member such as a link chain 8 is provided, the opposite ends thereof being attached to the face of the plate by means of the screws 7. In the modification shown in Fig. 3, the screws 7 and chain 8 have been replaced by a hook 9 fastened to the front face of the plate by means of screws 10, which do not extend beyond the rear face of the plate.

A pin 11 is provided which is adapted to extend into a second hole 14 extending through the lower portion of the plate, the block and the I beam. This pin is secured to the bracket to prevent loss thereof by means of a chain 12 fastened to the bracket, and from this construction, it will be readily understood that with the pin 11 in the position shown, the bracket will be maintained in a normally upright position.

The bracket is permanently attached to the frame of the trailer by means of the bolt 6, and when not in use, may be pivoted to an inoperative position where the sleeve 5 is substantially horizontal. When it is desired to use the bracket to raise or lower the trailer, the bracket is pivotally moved about the bolt 6 to its vertical or upright position, as shown in the drawing, and locked in place by means of the pin 11. The body of the jack is then placed in the sleeve 5 and a lifting part 13 of the jack engages the chain 8 or hook 9. The jack is then raised, thereby raising the body of the trailer to a position where the wheels may readily be removed. The jack is then lowered permitting the flat body of the trailer to rest on the ground. The equipment is then loaded on the trailer. The trailer is then raised, the wheels placed in their proper positions and the jack then removed. If the position of the bracket interferes with the equipment on the trailer, the pin 11 may be removed to permit the bracket to assume a horizontal, inoperative position. When the parts occupy the last-mentioned position, it will be understood that the sides of the plate 3 do not project above or below the frame member 1.

In the modification shown in Fig. 4, an alternate method of attaching the jack bracket to the trailer frame is disclosed. In this modification, the bolt 6 is dispensed with. A pair of vertically positioned guide brackets 15, 16 are mounted on the face of the I beam by means of bolts 17 or other suitable means. Each bracket has a flat face adapted to be fastened to the I beam, a portion extending at right angles to the flat face and in a direction away from the I beam and a lip portion. When the brackets are in operative position the lip portions are directed towards each other and provide a slot into which the jack bracket is positioned. In use, the jack bracket is slipped into the guide brackets and fastened to the I beam by means of the pin 11, the guide brackets preventing lateral shifting of the jack bracket.

While one form of the invention has been described herein, it will be readily understood by those skilled in the art that various modifications may be resorted to without departing from the spirit of the invention. Reference will therefore be had to the appended claim for a definition of the limits of the invention.

What is claimed is:

A jack bracket adapted to be fastened to the frame of a trailer body comprising a plate, a substantially vertically positioned sleeve member for receiving the body portion of a jack, means for attaching said sleeve member to said plate, a member attached to the plate for engaging a lifting part of a jack, means for pivotally mounting the bracket on the trailer frame so that the bracket may be pivoted to operative or inoperative position, and a pin attached to the bracket adapted to engage the body of the trailer and to lock the bracket in operative position.

DE MAR B. PERKINS.

References Cited in the file of this patent

UNITED STATES PATENTS

| Number | Name | Date |
|---|---|---|
| 1,485,228 | Johnson | Feb. 26, 1924 |
| 1,688,155 | Ryberg | Oct. 16, 1928 |
| 1,994,984 | Orlow | Mar. 19, 1935 |
| 2,162,181 | Skinner | June 13, 1939 |
| 2,369,545 | Dunn | Feb. 13, 1945 |
| 2,372,547 | Bryant | Mar. 27, 1945 |
| 2,378,836 | Coffing | June 19, 1945 |
| 2,476,838 | Coffing | July 19, 1949 |